United States Patent [19]

Wynosky

[11] Patent Number: 4,722,357
[45] Date of Patent: Feb. 2, 1988

[54] GAS TURBINE ENGINE NACELLE

[75] Inventor: Thomas A. Wynosky, Madison, Conn.

[73] Assignee: United Technologies Corporation, Hartford, Conn.

[21] Appl. No.: 850,644

[22] Filed: Apr. 11, 1986

[51] Int. Cl.⁴ ............................................. B64D 33/02
[52] U.S. Cl. ................................... 137/15.1; 181/214; 244/53 B
[58] Field of Search ........................... 137/15.1, 15.2; 181/214; 244/53 B

[56] References Cited

U.S. PATENT DOCUMENTS 3,667,703 6/1972 Bock ................................. 244/53 B
3,765,623 10/1973 Donelson ......................... 244/53 B
4,220,171 9/1980 Ruehr ................................. 137/15.1

Primary Examiner—Alan Cohan
Attorney, Agent, or Firm—Troxell K. Snyder

[57] ABSTRACT

A nacelle structure (14) for a gas turbine engine (4) extends upstream from the engine air inlet (10) and includes an external surface (18) and an internal surface (16). The external surface (18) is concentric about a linear centerline (22) which is disposed parallel to the free airflow stream (6) encountered by the nacelle (14) in flight. The internal surface (16) is concentric about a curved centerline (30), the curved centerline (30) being parallel to the free airflow stream (6) at the nacelle inlet (12) and parallel to the engine centerline (26) at the engine air inlet (10) for smoothly directing the internal airflow stream (32) into the engine air inlet (10).

3 Claims, 2 Drawing Figures

GAS TURBINE ENGINE NACELLE

TECHNICAL FIELD

The present invention relates to a nacelle for a gas turbine engine, and more particularly, to a nacelle for a gas turbine engine mounted on an aircraft.

BACKGROUND

Gas turbine engines used to propel today's subsonic commercial aircraft are typically surrounded by a nacelle structure having a drooped or angled inlet opening aligned relative to the direction of the surrounding airflow. This is particularly true for those engines mounted under the wings of an aircraft, wherein the influence of the surrounding aircraft structure, airfoil angle of attack, and other aerodynamic factors result in a nacelle inlet droop angle of approximately 3–5 degrees with respect to the engine centerline.

Prior art nacelle structures include a double wall intake portion extending upstream of the gas turbine engine air inlet and having internal and external surfaces defined by the end points of radii drawn perpendicular to a linear centerline parallel to the encountered airflow. The nacelle opening divides the free airstream into an internal portion which is directed into the gas turbine engine air inlet and an external portion which flows around the nacelle structure. The external surface configuration is defined so as to reduce the occurrence of shock waves or separation, thereby avoiding the creation of undesirable drag forces.

The interior surface, also symmetrical about the linear drooped centerline, forms a duct for directing internal flow in a direction generally parallel to the drooped nacelle centerline, but abruptly turning at the engine inlet to the direction of the engine centerline. Experience has shown that this turn introduces a circumferential static pressure gradient in the engine inlet region which decreases engine efficiency as well as increases generated noise.

U.S. Pat. No. 4,220,171 issued Sept. 2, 1980, to Ruehr et al. recognized this deficiency in the prior art nacelle structure and discloses the improvement wherein the internal and external nacelle surfaces are defined by the end points of radii drawn perpendicular to a curved centerline. The curved centerline is parallel to the free airstream flow at the nacelle inlet opening and parallel to the engine centerline at the engine air inlet opening. The structure of Ruehr et al. thus smoothly turns the internal airflow prior to entering the engine inlet, increasing engine efficiency by reducing internal static pressure loss and noise generation.

The curved external nacelle surface of Ruehr et al., however, has been found not to produce the same benefit. By forming the exterior surface about a curved centerline, the Ruehr et al. nacelle increases the local air velocity along the upper forward portion of the nacelle, increasing the likelihood of forming local shock waves and/or boundary layer separation. As noted above, such phenomena increase the undesirable surface drag on the nacelle structure resulting in higher aircraft operating costs. What is needed is a nacelle structure which provides reduced external aerodynamic drag while simultaneously avoiding the creation of internal static pressure losses. Disclosure of the Invention It is an object of the present invention to provide a nacelle structure internally configured to efficiently conduct a flow of air into a gas turbine engine mounted on an aircraft.

It is further an object of the present invention to provide a nacelle structure externally configured to reduce external aerodynamic drag and/or shock wave formation.

It is still further an object of the present invention to receive a flow of air at an angle with respect to the centerline of the gas turbine engine and to redirect the received air into the engine parallel to the engine centerline.

According to the present invention, an annular nacelle structure for a gas turbine engine disposed within a free flow of air extends upstream of the engine and has an inlet opening oriented perpendicularly with respect to the free airflow direction. Air received within the nacelle inlet opening is conducted through the nacelle and into the gas turbine engine by a duct formed by the nacelle internal surface. The internal surface is defined by the end points of radii extending perpendicularly outward from a curved centerline, the curved centerline further being colinear with the flow direction of the received air at the nacelle inlet and colinear with the gas turbine engine centerline at the engine air inlet.

The invention further provides an external nacelle surface defined by the end points of radii extending perpendicularly from a linear centerline, the linear centerline further being colinear with the flow direction of the received air at the nacelle inlet.

By providing separately developed internal and external aerodynamic surfaces for interacting with the respective internal and external airflow, the nacelle structure according to the present invention achieves efficient engine operation without the creation of external airflow shock waves. Each surface is thus shaped to perform its particular task without compromise, resulting in an overall fuel savings due to increased engine efficiency over prior art canted nacelle structures.

Both these and other objects will be apparent to those skilled in the art upon review of the following description and appended claims and drawing figures.

BEST MODE FOR CARRYING OUT THE INVENTION

Figure 1:
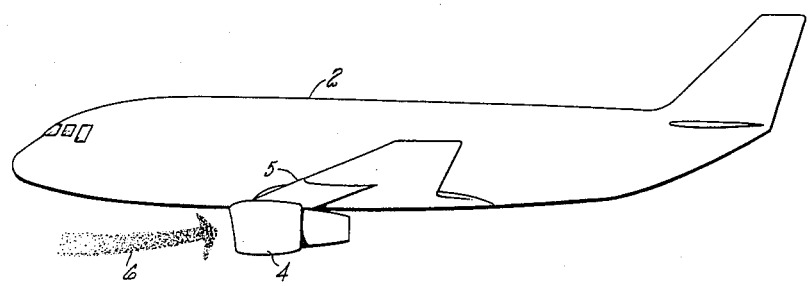
FIG. 1 is a side view of an aircraft with a gas turbine engine mounted under the wing.

Referring to FIG. 1, an aircraft 2 is shown with a gas turbine engine 4 mounted under the wing. The general effect of the wing and engine pylon 5 aerodynamics on the free external airflow is indicated by an arrow 6. For such configurations, the free airflow stream is deflected upward in a region just upstream of the engine and nacelle structure to follow an upward slant, blending with the wing airfoil aerodynamics. The gas turbine engine 4 is mounted such that the nacelle inlet extends into that portion of the airflow that has been deflected upwards.

Figure 2:
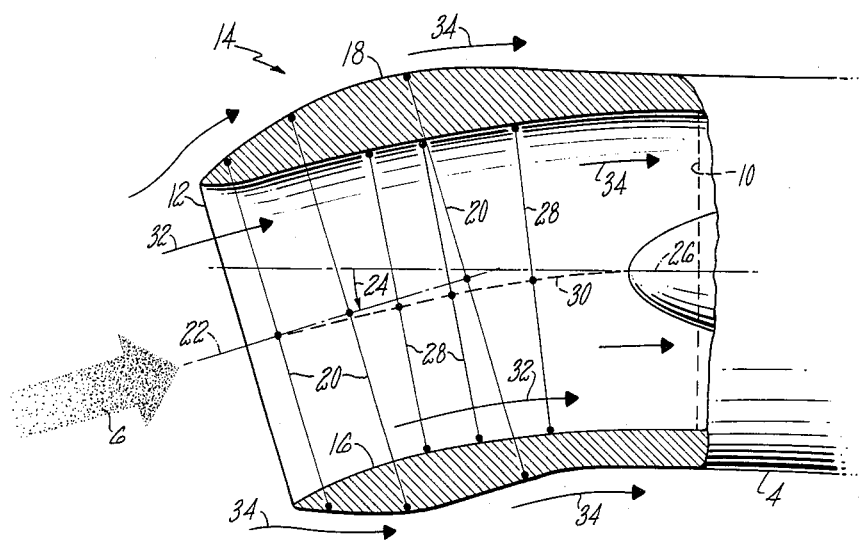
FIG. 2 is a cross-sectional view of the nacelle inlet structure according to the present invention.

FIG. 2 shows a cross section of the forward portion of a nacelle according to the present invention. The nacelle extends upstream of the gas turbine inlet 10 having a nacelle inlet opening 12 which is oriented perpendicularly with respect to the free airstream flow 6. The nacelle inlet structure 14 includes an internal surface 16 and an external surface 18. The external surface 18 is defined by the loci of the end points of a plurality of radii 20 drawn perpendicular to the external surface centerline 22.

As can be seen in FIG. 2, the external surface centerline 22 is parallel with the flow direction of the free external airflow 6 and forms an angle 24 with respect to the engine centerline 26. This angle 24, also termed the droop angle, has been exaggerated for clarity, typically being on the order of 3 to 5 degrees.

The internal surface 16 of the nacelle structure 14 is defined by the loci of the end points of a plurality of radii 28 drawn perpendicular to a curved centerline 30. The curved centerline 30 is colinear with the external surface centerline 22 at the forward end of the nacelle structure 14 adjacent the nacelle inlet 12, and is colinear with the engine centerline 26 adjacent the engine air inlet 10 at the downstream end of the nacelle structure 14.

During operation of an aircraft 2 equipped with a nacelle structure 14 according to the present invention, free-flowing external air 6 is separated between an internal flow 32 and an external flow 34. The internal flow 32 enters the nacelle inlet 12 and is smoothly turned by the internal surface 16, generally following the curved internal surface centerline 30. The result is that the internal airflow 32 is flowing substantially parallel to the engine centerline 26 by the time it enters the gas turbine air inlet 10.

The external portion 34 of the divided airflow does not experience this gradual turning, instead continuing to flow substantially linearly about the nacelle external surface 18 as defined by the linear external surface centerline 22. By maintaining the generally linear flow of the external air 34, the nacelle 14 according to the present invention reduces the likelihood of the formation of shock waves at the external surface 18 of the nacelle. Such shock waves result in an increased aerodynamic drag and an overall performance penalty for the operating aircraft.

Similarly, by providing a gradually turning intake duct, the internal surface 16 aligns and directs the internal airflow 32 with the gas turbine engine centerline 26, reducing losses which occurred in prior art linear duct structures having an abrupt redirection of the internal airflow at the engine inlet plane. The overall result is to improve overall performance of the engine and airframe combination without incurring the external aerodynamic drag losses associated with nacelle structures having exterior surfaces developed from curved centerlines as disclosed in the prior art.

It is therefore apparent that the present invention is well suited to achieve the objects set forth hereinabove, and it should also be apparent to those skilled in the art that the foregoing description is but one of a plurality of embodiments which may be made without departing from the scope of the invention as claimed hereinafter.

I claim:

1. A nacelle structure extending upstream of the air inlet opening of an aircraft gas turbine engine, comprising:
   an external surface defined by end points of radii extending perpendicularly to a linear, external surface centerline;
   an internal surface defined by end points of radii extending perpendicularly to a curved internal surface centerline; wherein
   the external surface centerline is oriented parallel with an external free flow of air encountering the nacelle structure, the external surface centerline further forming a droop angle with respect to the engine centerline, and wherein
   the internal surface centerline tangentially intersects both the external surface centerline and the engine centerline for smoothly directing a portion of the flowing air into the engine air inlet opening.

2. A nacelle structure for a gas turbine engine, comprising:
   an internal surface developed about a curved internal surface centerline, the internal surface centerline being colinear with a flow of air received within the upstream end of the nacelle structure and colinear with the centerline of the gas turbine engine at the gas turbine engine air inlet opening; and
   an external surface developed about a linear external surface centerline, the external surface centerline being parallel with the flow of received air.

3. A nacelle structure for a gas turbine engine substantially disposed in a unidirectional flow of air, the engine having a centerline inclined with respect to the direction of the flow of air, comprising:
   an annular inlet duct extending upstream of the gas turbine engine, the duct defining a nacelle inlet opening perpendicular to the airflow, and further including
   an internal surface for receiving air flowing through the nacelle inlet opening and conducting the received air into the gas turbine engine air inlet, the internal surface further being defined by the end points of radii drawn perpendicular to a curved internal centerline, the curved centerline further being colinear with the airflow direction and the engine centerline at the respective nacelle and engine inlets; and
   an external surface for directing air flowing around the nacelle structure, the external surface further being defined by the end points of radii drawn perpendicular to a linear external centerline, the external centerline being colinear with the airflow direction.

* * * * *